(12) United States Patent
Hannula et al.

(10) Patent No.: US 10,988,340 B2
(45) Date of Patent: Apr. 27, 2021

(54) FRACKING TOOLS AND METHODS OF FORMING THE SAME

(71) Applicant: Advanced Composites, Inc., West Valley City, UT (US)

(72) Inventors: Daniel B. Hannula, West Valley City, UT (US); Cody J. Janes, West Valley City, UT (US); Randall J. Philpot, West Valley City, UT (US); Carlton J. Sudbury, West Valley City, UT (US)

(*) Notice: Subject to any disclaimer, the term of this patent is extended or adjusted under 35 U.S.C. 154(b) by 346 days.

(21) Appl. No.: 15/917,407

(22) Filed: Mar. 9, 2018

(65) Prior Publication Data
US 2019/0275751 A1    Sep. 12, 2019

(51) Int. Cl.
| | | |
|---|---|---|
| B65H 55/04 | (2006.01) | |
| B29C 70/30 | (2006.01) | |
| B29C 70/32 | (2006.01) | |
| E21B 33/12 | (2006.01) | |
| B24B 11/08 | (2006.01) | |
| B24B 37/025 | (2012.01) | |
| B65H 71/00 | (2006.01) | |
| B29C 70/24 | (2006.01) | |
| B29C 53/58 | (2006.01) | |
| B29C 53/60 | (2006.01) | |
| B29L 31/00 | (2006.01) | |
| E21B 43/26 | (2006.01) | |
| B29K 309/08 | (2006.01) | |

(52) U.S. Cl.
CPC .............. *B65H 55/04* (2013.01); *B24B 11/08* (2013.01); *B24B 37/025* (2013.01); *B29C 53/58* (2013.01); *B29C 53/60* (2013.01); *B29C 70/24* (2013.01); *B29C 70/30* (2013.01); *B29C 70/32* (2013.01); *B65H 71/005* (2013.01); *E21B 33/12* (2013.01); *B29K 2309/08* (2013.01); *B29L 2031/7734* (2013.01); *E21B 43/26* (2013.01)

(58) Field of Classification Search
CPC ......... B29C 53/60; B29C 53/58; B29C 70/32; B29C 70/24; B29C 70/30; B65H 55/04; E21B 33/12
See application file for complete search history.

(56) References Cited

U.S. PATENT DOCUMENTS

| | | | | |
|---|---|---|---|---|
| 4,220,497 A | * | 9/1980 | Carley | ................. B29C 70/083 156/174 |
| 4,623,290 A | * | 11/1986 | Kikuzawa | ............... B29C 70/22 411/350 |
| 2009/0011247 A1 | * | 1/2009 | Barlow | ................. B29C 70/085 428/413 |
| 2014/0072740 A1 | * | 3/2014 | Zaiser | ..................... C03C 25/14 428/35.7 |
| 2014/0261847 A1 | * | 9/2014 | Molina | .................. B29C 70/30 138/145 |

* cited by examiner

*Primary Examiner* — Christopher T Schatz
(74) *Attorney, Agent, or Firm* — Michael F. Krieger; Kirton McConkie

(57) ABSTRACT

A method of forming a fracking tool, such as a frac ball or a frac plug mandrel, may include: applying a resin to wet a filament; winding the wetted filament to form a cylinder; placing the cylinder in a cylindrical mold; increasing a pressure in the cylindrical mold to at least 3,000 psi; curing the resin at the pressure and a temperature of at least 250° F.; and extracting the cylinder from the mold. In some instances, the method may further include adding the resin and/or another resin into the cylindrical mold.

11 Claims, 18 Drawing Sheets

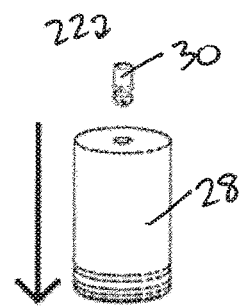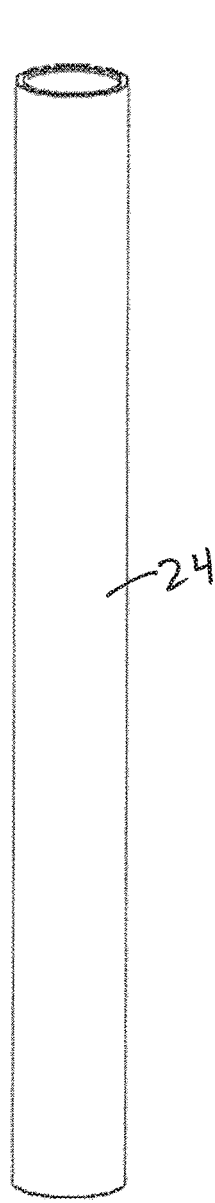
FIG. 2C    FIG. 2D

100

```
┌─────────────────────────────────────────┐
│ APPLY A RESIN TO WET A FILAMENT 102     │
└─────────────────────────────────────────┘
                    ↓
┌─────────────────────────────────────────┐
│ WIND, WITHOUT A CORE, THE WETTED        │
│ FILAMENT TO FORM A CYLINDER 104         │
└─────────────────────────────────────────┘
                    ↓
┌─────────────────────────────────────────┐
│ PLACE THE CYLINDER INTO A CYLINDRICAL   │
│ MOLD 106                                │
└─────────────────────────────────────────┘
                    ↓
┌─────────────────────────────────────────┐
│ PUMP THE RESIN AND/OR ANOTHER RESIN     │
│ INTO THE CYLINDRICAL MOLD 108           │
└─────────────────────────────────────────┘
                    ↓
┌─────────────────────────────────────────┐
│ INCREASE A PRESSURE IN THE              │
│ CYLINDRICAL MOLD TO AT LEAST 500 PSI    │
│ 110                                     │
└─────────────────────────────────────────┘
                    ↓
┌─────────────────────────────────────────┐
│ CURE THE RESIN AT THE PRESSURE AND A    │
│ TEMPERATURE OF AT LEAST 250°F 112       │
└─────────────────────────────────────────┘
                    ↓
┌─────────────────────────────────────────┐
│ EXTRACT THE CYLINDER FROM THE MOLD      │
│ 114                                     │
└─────────────────────────────────────────┘
                    ↓
┌─────────────────────────────────────────┐
│ GRIND THE CYLINDER INTO ONE OR MORE     │
│ GENERALLY SPHERICAL FRAC BALLS 116      │
└─────────────────────────────────────────┘
```

```
┌─────────────────────────────────────────┐
│   APPLY A RESIN TO WET A FILAMENT 202   │
└─────────────────────────────────────────┘
                    ↓
┌─────────────────────────────────────────┐
│   WIND, WITH A CORE, THE WETTED         │
│   FILAMENT TO FORM A CYLINDER HAVING A  │
│   BORE EXTENDING THERETHROUGH 204       │
└─────────────────────────────────────────┘
                    ↓
┌─────────────────────────────────────────┐
│   PLACE THE CYLINDER INTO A CYLINDRICAL │
│   MOLD 206                              │
└─────────────────────────────────────────┘
                    ↓
┌─────────────────────────────────────────┐
│   PUMP THE RESIN AND/OR ANOTHER RESIN   │
│   INTO THE CYLINDRICAL MOLD 208         │
└─────────────────────────────────────────┘
                    ↓
┌─────────────────────────────────────────┐
│   INCREASE A PRESSURE IN THE            │
│   CYLINDRICAL MOLD TO AT LEAST 500 PSI  │
│   210                                   │
└─────────────────────────────────────────┘
                    ↓
┌─────────────────────────────────────────┐
│   CURE THE RESIN AT THE PRESSURE AND A  │
│   TEMPERATURE OF AT LEAST 250°F 212     │
└─────────────────────────────────────────┘
                    ↓
┌─────────────────────────────────────────┐
│   EXTRACT THE CYLINDER FROM THE MOLD    │
│   214                                   │
└─────────────────────────────────────────┘
```

FIG. 8

FRACKING TOOLS AND METHODS OF FORMING THE SAME

BACKGROUND OF THE INVENTION

"Hydraulic fracturing" or "fracking" refers to well formation techniques in which rock is fractured by a pressurized fracking fluid to facilitate removal of hydrocarbon materials disposed within the rock, such as, for example, oil and gases. A well may include a tubular casing and pumping system for high-pressure injection of the fracking fluid, which may include water, sand, or other proppants suspended with the aid of thickening agents.

Several hydraulic fracking techniques are currently used. In some instances, one or more fracking plugs ("frac plugs") may be positioned within the tubular casing, dividing the tubular casing into multiple sections. Each of the frac plugs may include a fluid passage that allows the fracking fluid to flow through the frac plug. The fluid passage of the frac plug may include a ball seat, which may be positioned at a forward end of the frac plug or the end of the frac plug closest to a well head when the frac plug is disposed within the tubular casing.

The ball seat may be configured to receive a fracking ball ("frac ball"). The frac ball may be dropped into the tubular casing and carried with fluid flow until it reaches the ball seat. Once the frac ball is properly positioned within the ball seat, the fracking fluid may be prevented from flowing through the frac plug. Thus, the frac ball may serve to segment the tubular casing, closing the plug fluid passage such that perforation and/or fracking may be limited to specific sections of the tubular casing or well. When the frac ball is positioned within ball seat, the fracking fluid on one side of the frac plug and frac ball may then be increased substantially in pressure to perform the perforation and/or fracking process. When the fracking process is complete, the proppants may hold the fractures open. It is important that fracking tools, such as, for example, the frac ball and frac plug, be able to withstand the high pressure and temperature that allows a successful fracking process.

It is to be understood that both the foregoing general description and the following detailed description are exemplary and explanatory and are not restrictive of the invention, as claimed.

BRIEF SUMMARY OF THE INVENTION

The present disclosure relates generally to fracking tools and methods of forming the same. In some embodiments, the fracking tools may include frac balls and/or frac plug mandrels. In some embodiments, a method of forming one or more frac balls may include one or more of the following: applying a resin to wet a filament; winding, without a core, the wetted filament to form a cylinder; placing the cylinder in a cylindrical mold; adding the resin and/or another resin into the cylindrical mold after the cylinder is placed in the cylindrical mold; increasing a pressure in the cylindrical mold; curing the resin at the pressure and a temperature, such as, for example, at least 250° F.; extracting the cylinder from the mold; carving the cylinder into one or more spherical frac balls; and using a lapping wheel and/or vibratory container to achieve a final diameter and/or finish of the spherical frac balls.

In some embodiments, the filament may include e-glass and/or one or more other materials. In some embodiments, the wetted filament may be wound at multiple angles without the core to form the cylinder. In some embodiments, the wetted filament may be wound using a winding machine, which may be coreless and may include a first driven element and a second driven element. In some embodiments, the winding machine may include a first driven element or headstock and a second driven element or tailstock, and no core or form may be wound over such that a resulting wound object is a solid cylindrical shape or another shape. In some embodiments, the wetted filament may be strung between the first driven element and the second driven element.

In some embodiments, carving the cylinder into the spherical frac balls may include rough grinding the cylinder using a diamond abrasive grinding wheel. In some embodiments, the cylinder may be carved into at least eight spherical frac balls. In some embodiments, the spherical frac balls may include any suitable size or outer diameter. In some embodiments, the spherical frac balls may each include an outer diameter between 2 and 3 inches, such as, for example, 2.25 inches.

In some embodiments, the spherical frac balls may include the resin and multiple overlapping filament fragments formed in response to the carving of the filament. In some embodiments, the resin and the filament fragments may have been exposed to the pressure and the temperature within the cylindrical mold. In some embodiments, the spherical frac balls may be solid.

In some embodiments, a method of forming a mandrel of a frac plug may include one or more of the following: applying a resin to wet a filament; winding, with a core, the wetted filament to form a cylinder having a bore extending therethrough; placing the cylinder in a cylindrical mold; adding the resin and/or another resin into the cylindrical mold; increasing a pressure in the cylindrical mold; curing the resin at the pressure and a temperature, such as, for example, at least 250° F.; extracting the cylinder from the mold; and using a lapping wheel and/or vibratory container to achieve a final diameter and/or finish of the cylinder, which may correspond to the mandrel. In some embodiments, in addition to or as an alternative to using the lapping wheel and/or the vibratory container, the method of forming the mandrel of may include grinding a shape of the mandrel using a tool post grinder with a diamond abrasive wheel, which may be mounted to a carriage or table of a computer numeric control ("CNC") lathe. The mandrel may be used as a primary component of the frac plug and may include a fluid passage extending therethrough due to the winding of the filament with the core. In some embodiments, the core may be a cylindrical steel core or another suitable form.

In some embodiments, the cylinder may be generally cylindrical. In some embodiments, the frac ball and/or the mandrel may include a cylindrical cross section. In some embodiments, the cylinder may include a cylindrical or generally cylindrical portion of the wound filament. For example, the filament may be wound into the cylinder and one or more portions adjoining the cylinder. In some embodiments, the cylinder and the one or more other portions may form an overall shape of the mandrel, for example.

It is to be understood that both the foregoing general description and the following detailed description are exemplary and explanatory and are not restrictive of the invention, as claimed.

BRIEF DESCRIPTION OF THE SEVERAL VIEWS OF THE DRAWINGS

Example embodiments will be described and explained with additional specificity and detail through the use of the accompanying drawings in which:

FIG. 2C is another partial exploded view of the cylindrical mold, illustrating the cylinder fully inserted into the body, according to some embodiments;

FIG. 2D is another partial exploded view of the cylindrical mold, illustrating an example plunger inserted into the body, according to some embodiments;

FIG. 7 is a flow diagram of an example method of forming one or more frac balls, according to some embodiments; and FIG. 8 is a flow diagram of an example method of forming a frag plug mandrel, according to some embodiments.

DETAILED DESCRIPTION OF THE INVENTION

Figure 1A:
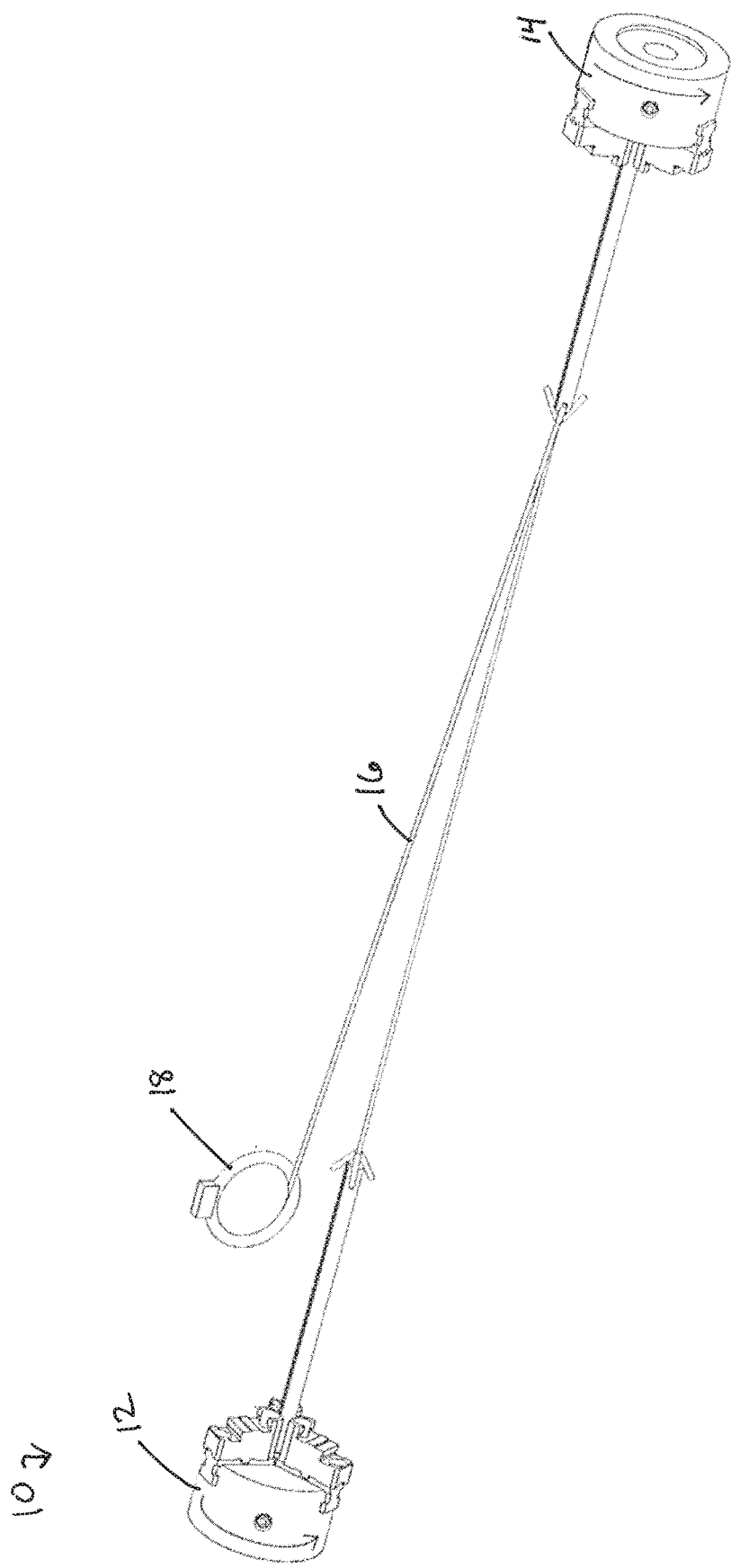
FIG. 1A is an upper perspective view of an example winding machine, having a first driven element and a second driven element, according to some embodiments.
Figure 1B:
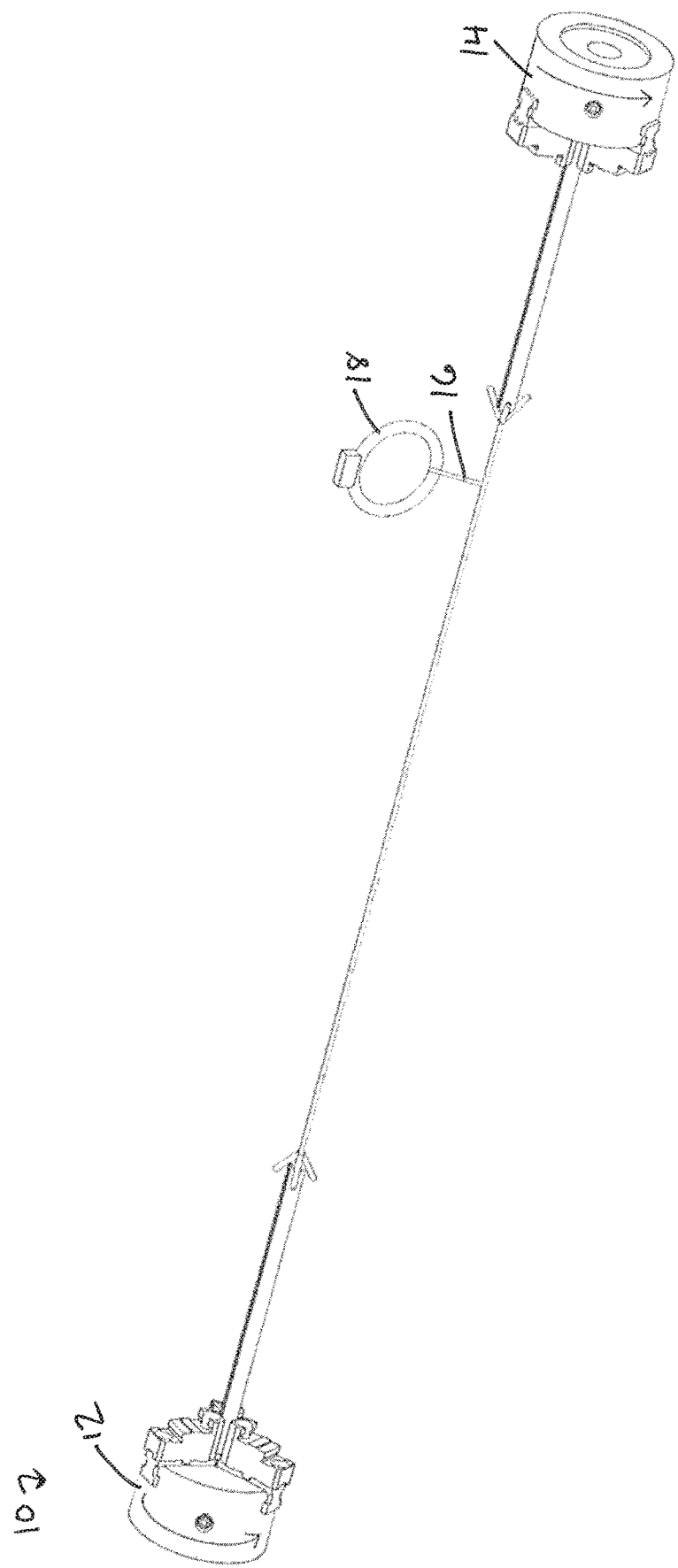
FIG. 1B is an upper perspective view of the winding machine of FIG. 1A, illustrating an example filament being wound at approximately 90°, according to some embodiments.
Figure 1C:
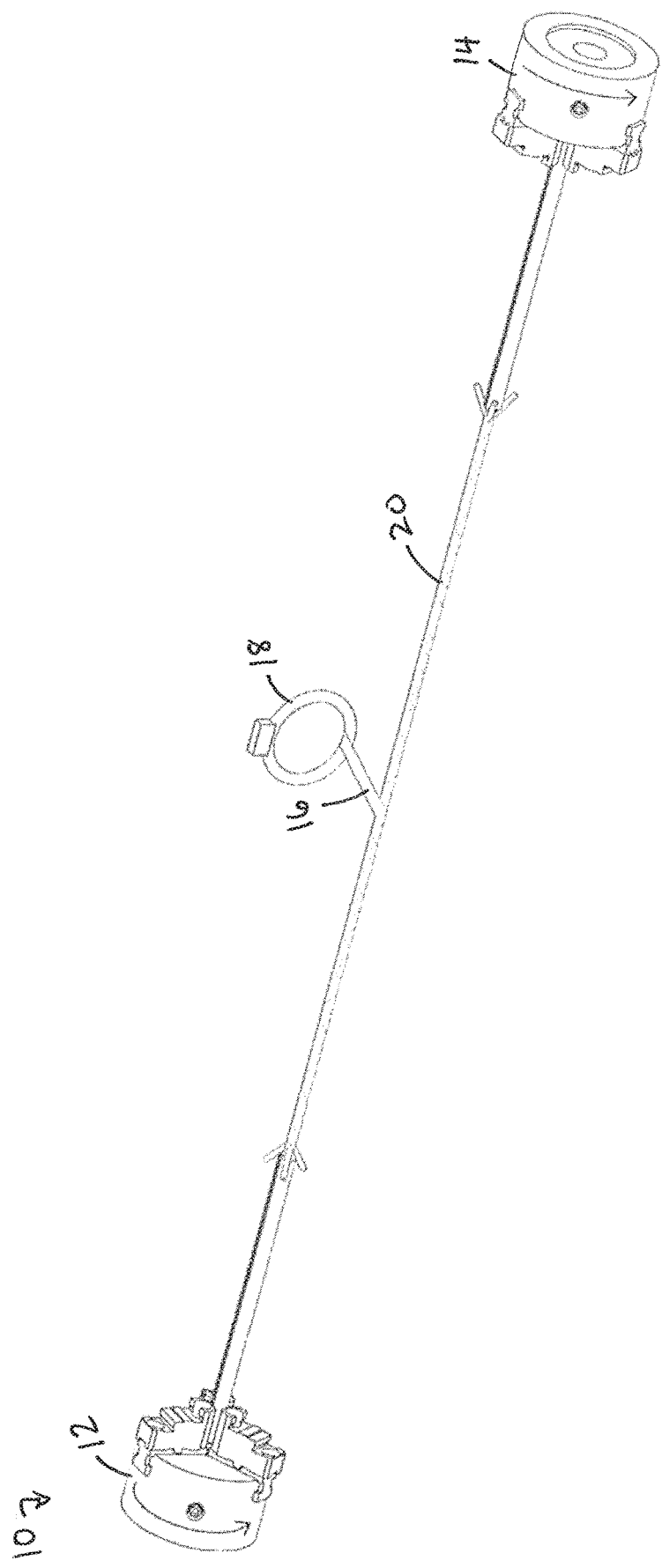
FIG. 1C is another upper perspective view of the winding machine, illustrating the filament being wound at approximately 45°, according to some embodiments.
Figure 1D:
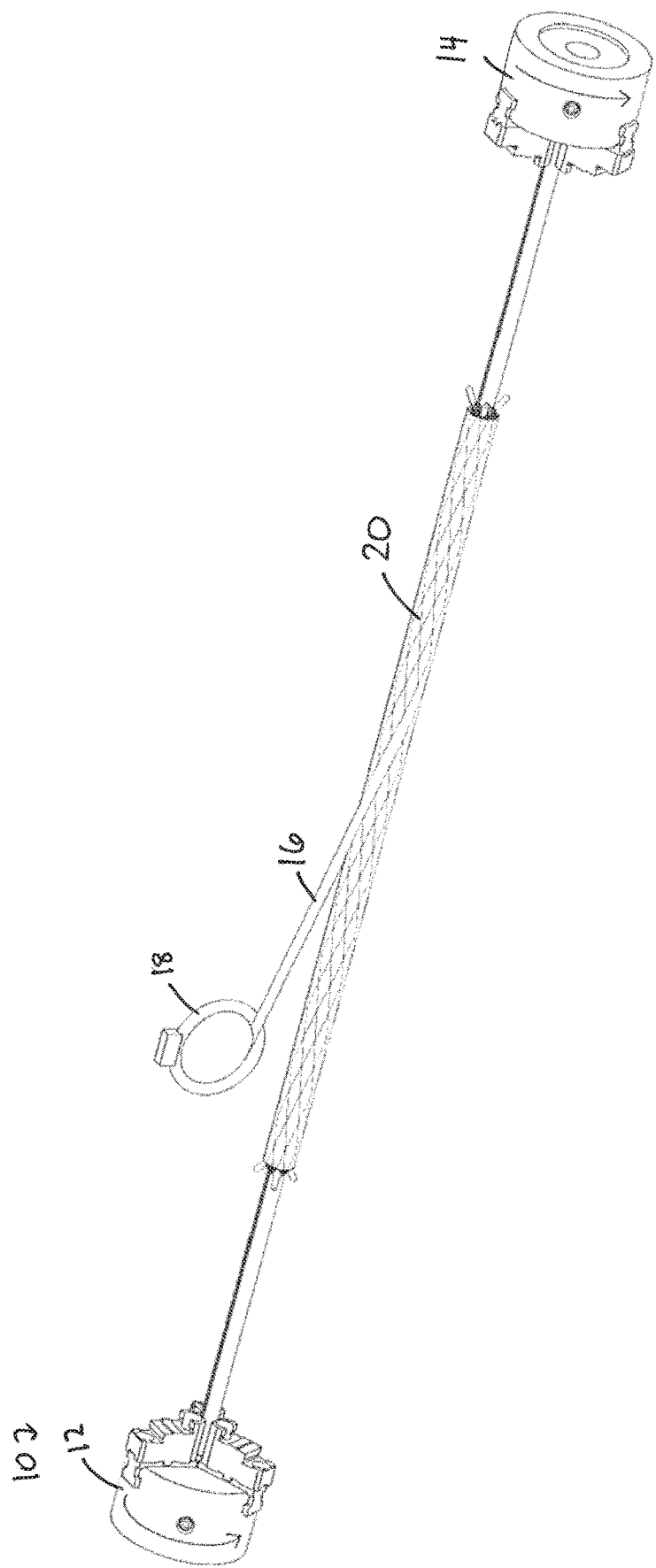
FIG. 1D is another upper perspective view of the winding machine, illustrating the filament being wound at approximately 15°, according to some embodiments.
Figure 1E:
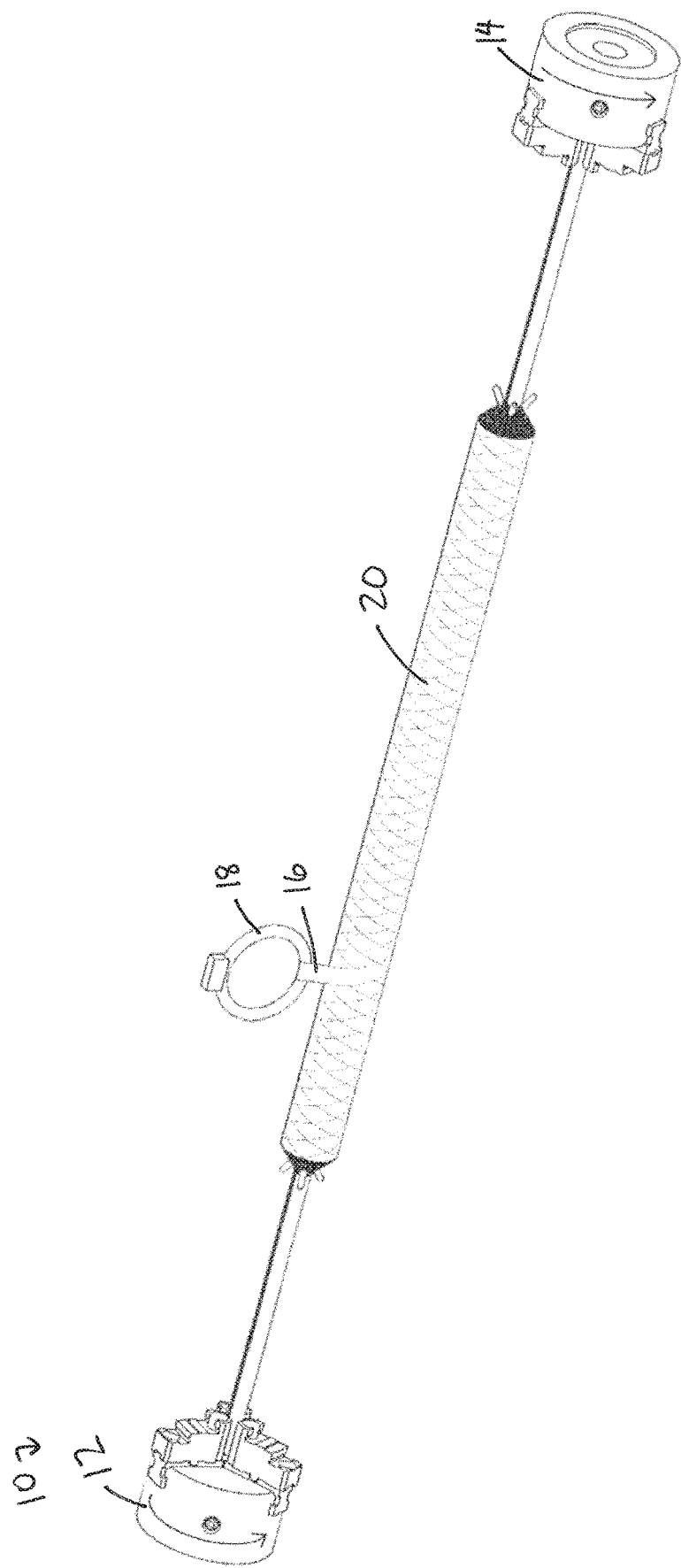
FIG. 1E is another upper perspective view of the winding machine, illustrating the filament being wound at approximately 60°, according to some embodiments.
Figure 2A:
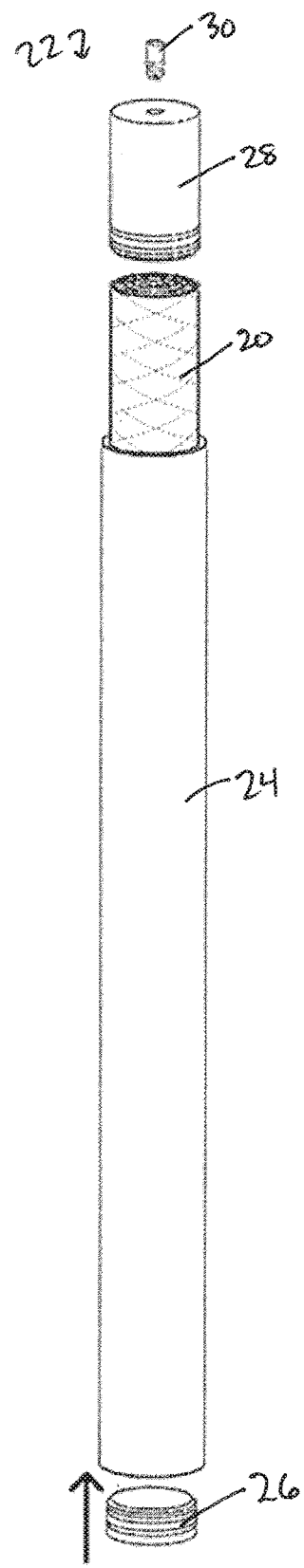
FIG. 2A is an exploded view of an example cylindrical mold, illustrating an example cylinder partially inserted into an example body of the cylindrical mold, according to some embodiments.
Figure 2B:
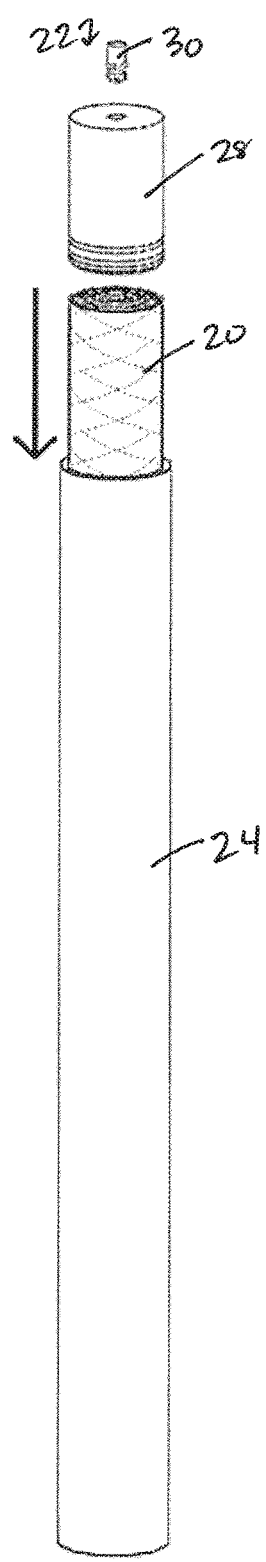
FIG. 2B is a partial exploded view of the cylindrical mold, illustrating an example end cap inserted into the body, according to some embodiments.
Figure 2E:
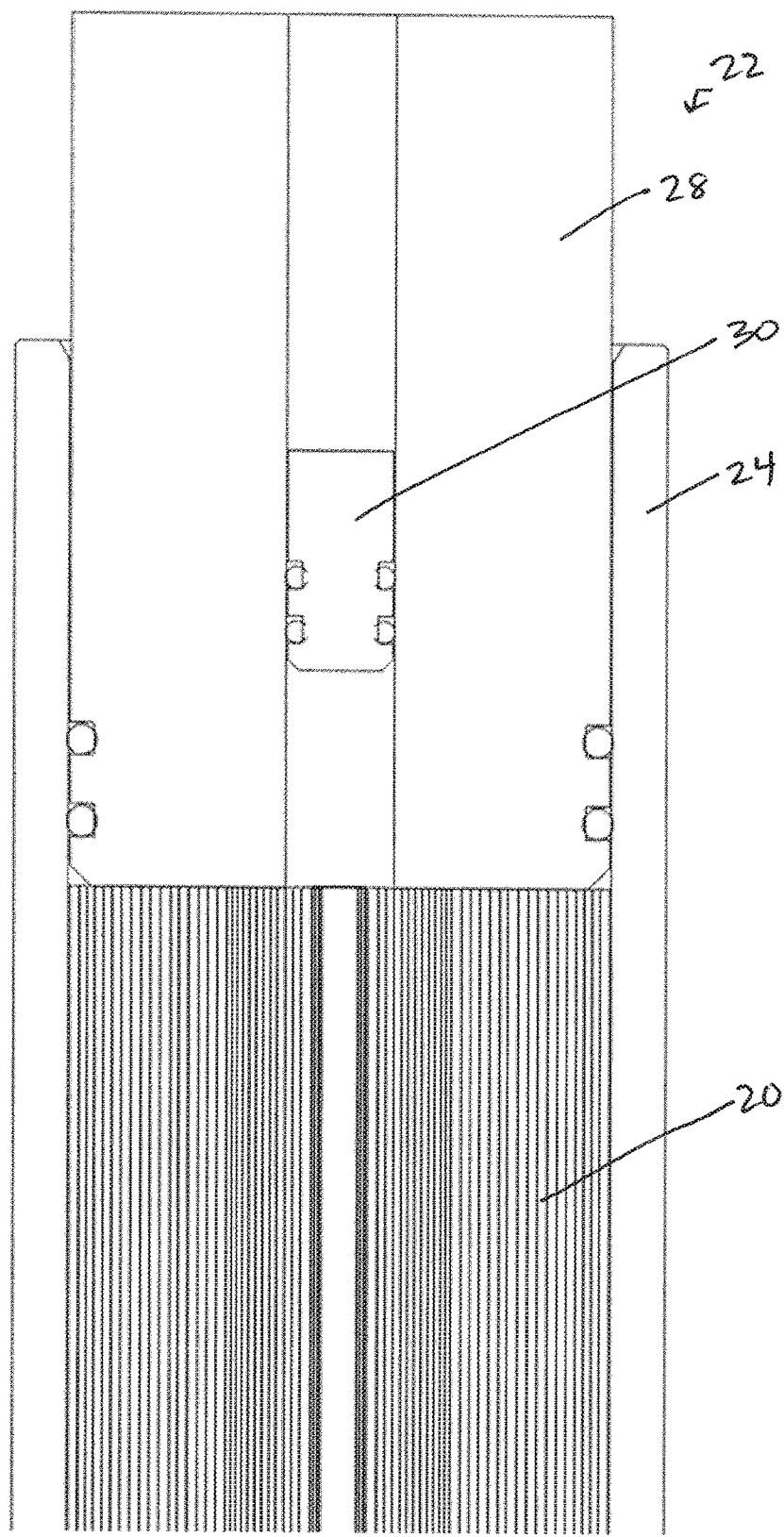
FIG. 2E is a cross-sectional view of an assembled plunger portion of the cylindrical mold, according to some embodiments.

The presently preferred embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Referring now to FIGS. 1A-1E, an example winding machine 10 may include a first driven member 12, a second driven member 14, and no core or mandrel. In some embodiments, the first driven member 12 and the second driven member 14 may be similar to a headstock and tailstock of a lathe except that both may be driven. In some embodiments, a first end of a filament 16 may be coupled to the first driven member 12 and/or a middle portion of the filament 16 may be coupled to the second driven member 14 such that the filament 16 is strung between the first driven member 12 and the second driven member 14.

In some embodiments, the first driven member 12 and the second driven member 14 may rotate while a delivery eye 18 of a carriage (not illustrated) traverses horizontally with respect to an axis extending between the first driven member 12 and the second driven member 14, laying down the filament 16 and winding the filament 16 on top of itself. In some embodiments, a cylinder 20 may be formed between the first driven member 12 and the second driven member 14. In some embodiments, because the cylinder 20 is wound without a core, the cylinder 20 may be solid or continuous.

In some embodiments, the filament 16 may be wound at multiple angles, which may provide circumferential and/or longitudinal tensile strength. In further detail, in some embodiments, a portion of the filament 16 disposed between the delivery eye 18 and the cylinder 20 may be angled with respect to the cylinder 20 or the axis extending between the first driven member 12 and the second driven member 14, as illustrated in FIGS. 1B-1E. In some embodiments, the angle of the portion of the filament 16 with respect to the cylinder 20 or the axis extending between the first driven member 12 and the second driven member 14 may change as the cylinder 20 is wound. In some embodiments, the filament 16 may be wound at various angles, in various orders, to form the cylinder 20.

In some embodiments, a winding machine used to form one or more frac plug mandrels may include a core (not illustrated), and thus, the filament 16 may be wound around the core. In some embodiments, the winding machine used to form the frac plug mandrels may include the delivery eye 18, and the filament 16 may be wound at multiple angles as described above to form the cylinder 20, which may include a bore extending therethrough due to the presence of the core.

In some embodiments, the cylinder 20 may be formed from a single, continuous filament 16. In some embodiments, the filament 16 may include any type of suitable material. In some embodiments, the filament 16 may include e-glass and/or one or more other suitable materials In some embodiments, the filament 16 may include one or more of the following materials: e-glass, carbon, graphite, boron, ceramic, silicon carbide, thermoplastic polymer, polyether ether ketone (PEEK), etc. In some embodiments, a resin may be applied to the filament 16 to wet the filament 16. In some embodiments, the resin may be applied to the filament 16 in various ways. For example, the filament 16 may be pre-impregnated with the resin and/or pulled through a resin bath before being attached to the winding machine 10. In some embodiments, the filament 16 may be wound dry and then infused with the resin in a secondary process.

Referring now to FIGS. 2A-2E, in some embodiments, the cylinder 20 may be placed in a cylindrical mold 22. In some embodiments, the cylindrical mold 22 may include a body 24, which may include a cylindrical inner surface configured to receive the cylinder 20. It is understood that an outer surface of the body 24 may include various shapes. In some embodiments, the body 24 may be pipe-shaped, having at least one open end. In some embodiments, the body 24 may be constructed of metal or another suitable material. In some embodiments, the inner surface of the body 24 may have a slightly larger circumference than the cylinder such that the cylinder may slide into and/or out of the body 24. In some embodiments, where a frac plug mandrel is desired, the body 24 may include a rod or similar structure (not illustrated) configured to extend through the bore of the cylinder 20. It is contemplated that a mold may include a shape other than cylindrical, in some embodiments.

In some embodiments, an end cap 26 may be disposed in a first end of the body 24 to seal the first end of the body 24. In some embodiments, a second end of the body 24 may include one or more pistons or plungers, which may allow a pressure within the cylindrical mold 22 to be increased. In some embodiments, the pressure within the cylindrical mold 22 may be increased to be within a range of about 300-500 psi, 500-700 psi, 700-1000 psi, 1000-1500 psi, 1500-2000 psi, 2000-2500 psi, 2500-3000 psi, 3000-5000 psi, 5000-7000 psi, 7000-10000 psi, or 10000-12000 psi. In some embodiments, the pressure within the cylindrical mold 22 may be increased to greater than 3,000 psi, greater than 9,000 psi, or greater than 10,000 psi. In some embodiments, the pressure within the cylindrical mold 22 may reduce entrapped air and voids to reduce possible leak paths. In some embodiments, the pressure may force layers of the filament together to form a cylinder that can withstand high pressures and temperatures. In some embodiments, when the pressure is greater than 3,000 psi, a very strong composite that can withstand high pressures and temperatures may result.

In some embodiments, a plunger portion of the cylindrical mold 22 may include a first plunger 28 and a second plunger 30 disposed within the first plunger 28. In some embodiments, the first plunger 28 and/or the second plunger 30 may be coupled with a rod (not illustrated). In some embodiments, the second plunger 30 may allow for more precise increases or decreases in pressure within the cylindrical mold 22. In some embodiments, the second plunger 30 may allow for adding more resin once the cylinder 20 has been compressed to further reduce or eliminate any remaining voids or entrapped air. In some embodiments, the first plunger 28 and/or the second plunger 30 may be forced towards the first end of the body 24 or end cap 26 to increase the pressure within the cylindrical mold 22. In some embodiments, the first plunger 28 and/or the second plunger 30 may include one or more grooves to fit elastomeric or metal seals. It is contemplated that the first end and/or the second end of the body 24 may include one or more pistons or plungers.

In some embodiments, after the cylinder 20 is placed into the cylindrical mold 22 and the end cap 26 and plunger portion seal the ends of the body 24, a pressure within the cylindrical mold 22 may be increased via the plunger portion, which may facilitate removal of leak paths within the cylinder 20. In some embodiments, when external pressure is applied to the cylinder, voids and air entrapped in the cylinder 20 may be reduced or eliminated.

In some embodiments, after the cylinder 20 is placed into the cylindrical mold 22 and the end cap 26 and plunger portions seal the ends of the body 24, the resin and/or another resin may be added into the cylindrical mold 22. In some embodiments, the resin and/or another resin may be added into the cylindrical mold 22 via pumping. In some embodiments, the resin and/or the other resin may be added to an open end of the mold 22 prior to capping or closing the mold 22 and pressurizing. In some embodiments, the resin and/or the other resin may be added into the cylindrical mold 22 at a pressure, such as, for example, 500 psi or greater, using a hydraulic pump or another suitable mechanism.

In some embodiments, a temperature within the cylindrical mold 22 may be increased, which may cure the resin and/or the other resin. In some embodiments, the temperature may be increased to within a range of about 250-300° F., 300-350° F., 350-400° F., greater than 300° F., or greater than 400° F. In some embodiments, the temperature may be increased to 350° F. In some embodiments, the pressure may be applied to the cylinder 20 during the curing process or while the temperature is at least 300° F., which may facilitate reduction of voids and air entrapped in the cylinder 20 and/or yield a translucent cylinder 20 as opposed to an opaque one.

In some embodiments, a cure profile may include several temperature stages, which may occur within the cylindrical mold 22. As an example, a first stage may include initial gelling and/or curing of the resin at a lower temperature, such as, for example, about 150-200° F. As another example, a second stage may include curing at a higher temperature, such as, for example, about 250-300° F. As yet another example, a third stage may include curing at an even higher temperature, such as, for example, about 350° F. In some embodiments, each stage may last between about 1-4 hours. In some embodiments, the pressure may be maintained, increased, or decreased during one or more of the stages.

Figures 3A, 3B, 3C:
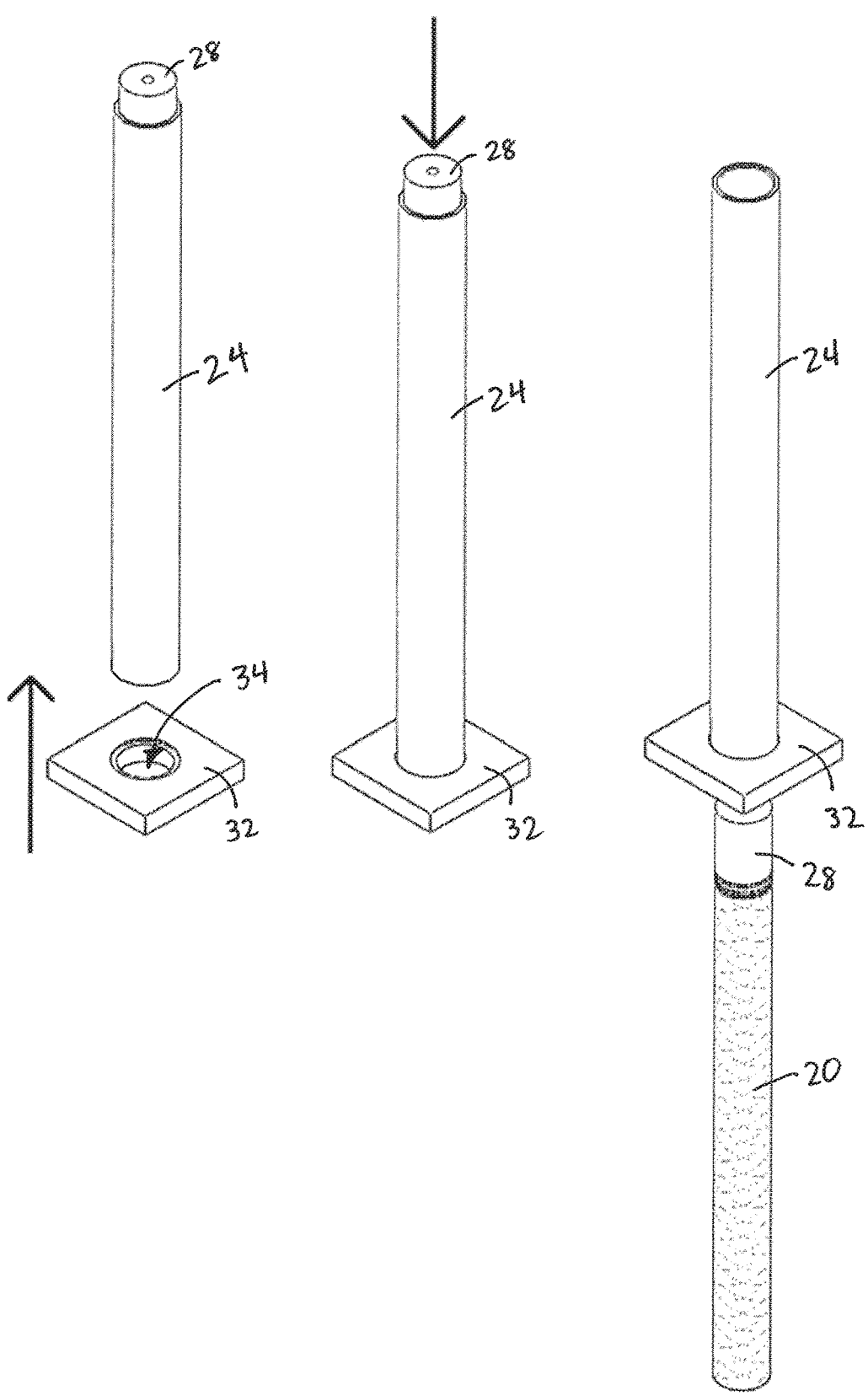
FIG. 3A is an upper perspective view of an example extraction plate, according to some embodiments.
FIG. 3B is an upper perspective view of the cylinder being extracted from the body via the extraction plate, according to some embodiments.
FIG. 3C is an upper perspective view of the cylinder extracted from the body, according to some embodiments.
Figure 4A:
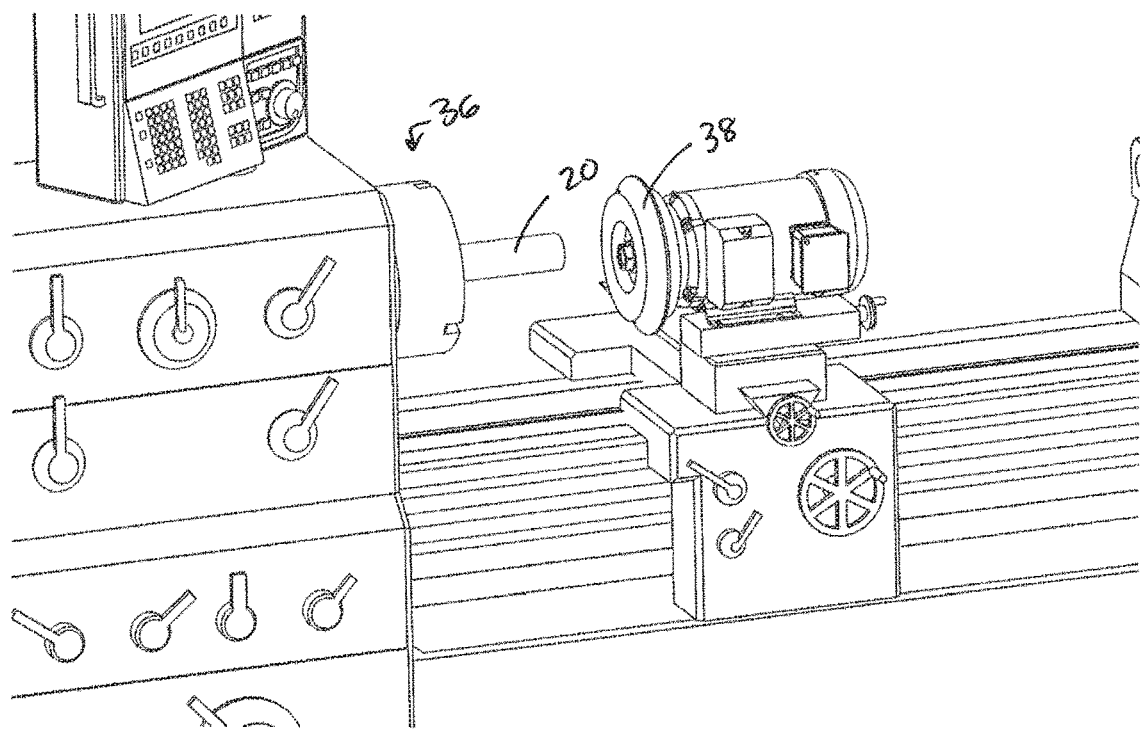
FIG. 4A is an upper perspective view of an example tool post grinder with a radiused grinding wheel and CNC lathe, according to some embodiments.
Figure 4B:
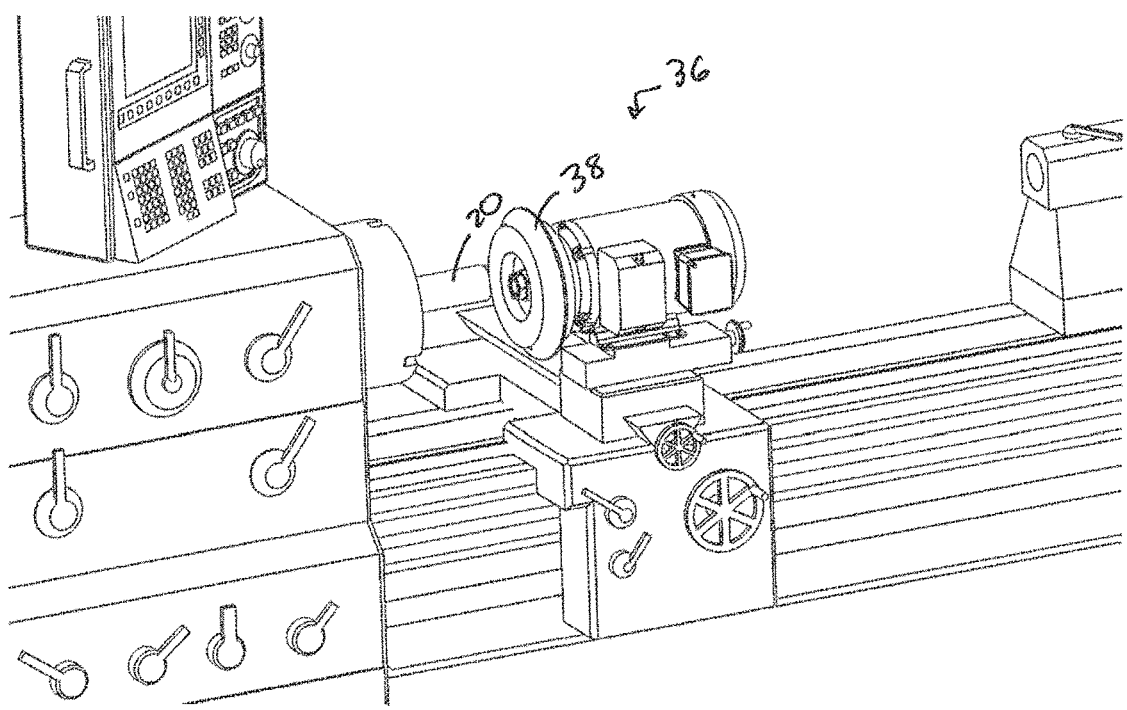
FIG. 4B is an upper perspective view of the grinding wheel grinding the cylinder, according to some embodiments.
Figure 4C:
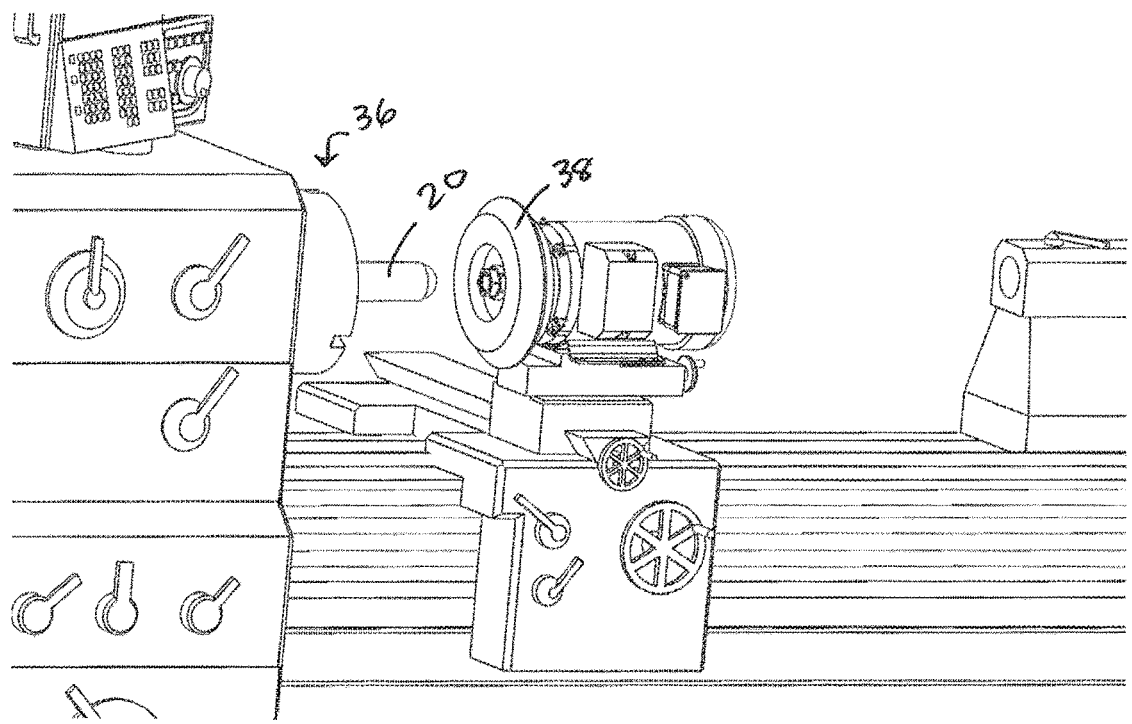
FIG. 4C is an upper perspective view of a first half of a sphere shape ground by the grinding wheel, according to some embodiments.
Figure 4D:
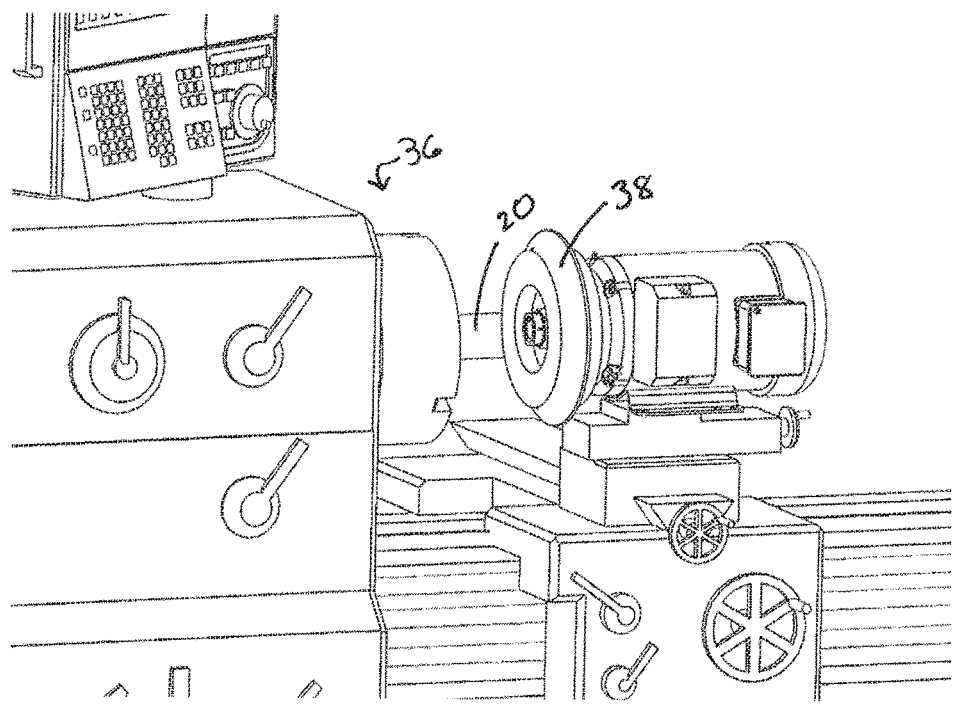
FIG. 4D is an upper perspective view of the grinding wheel grinding a second half of the sphere shape, according to some embodiments.
Figure 4E:
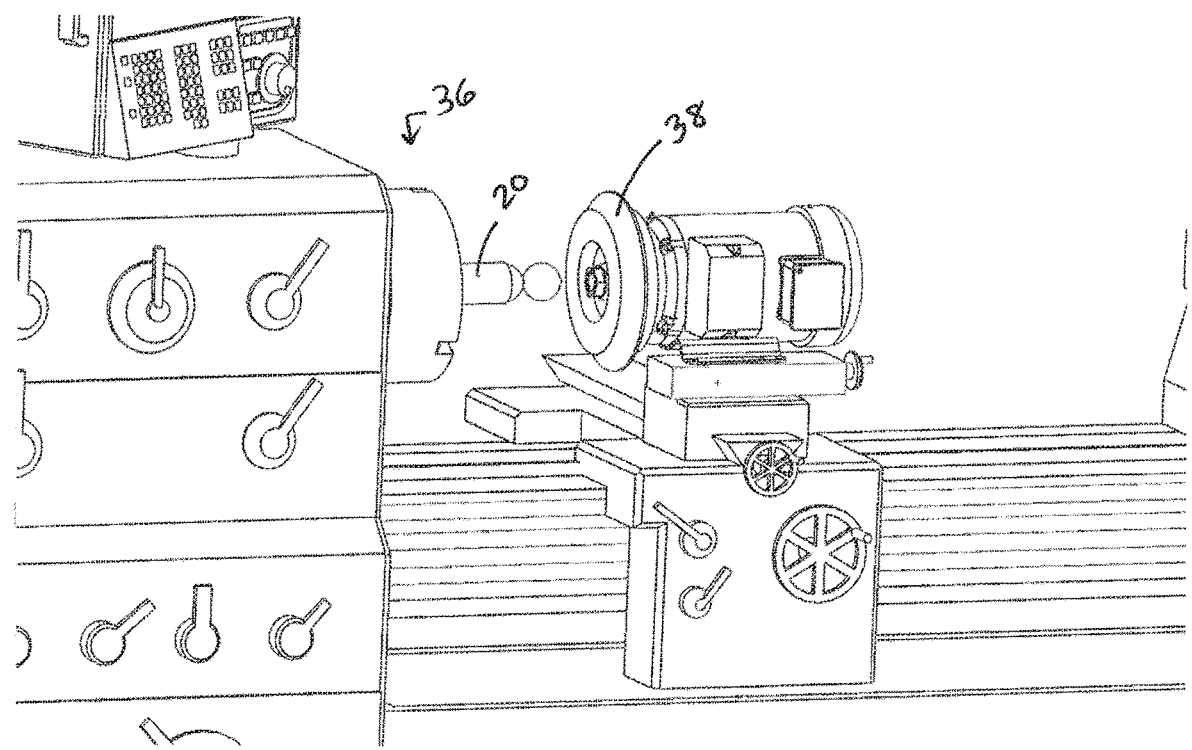
FIG. 4E is an upper perspective view of the sphere shape completed by the grinding wheel, according to some embodiments.

Referring now to FIGS. 3A-3C, in some embodiments, the cylinder 20 may be extracted from the cylindrical mold 22, including the body 24, using an extraction plate 32. In some embodiments, the extraction plate 32 may include an aperture 34 having a circumference greater than a circumference of the cylinder 20 and less than a circumference of the outer surface of the body 24. In some embodiments, the body 24 may be aligned with the aperture 34, and a force may be applied to the cylinder 20 and/or the plunger portion in a direction of the extraction plate. The body 24 may be prevented from moving through the aperture 34 due to its size, but the cylinder 20 and/or the plunger portion may be removed from the first end of the body 24, which may have the end cap 26 removed. It is contemplated that the cylinder 20 may be removed from the cylindrical mold 22 using various methods, which may not include the extraction plate 32.

Referring now to FIG. 4A-4E, in some embodiments, the cylinder 20 may be secured to a CNC lathe 36 and carved into one or more spherical frac balls. It is contemplated that the cylinder 20 may be carved into the frac balls using various methods. In some embodiments, carving the cylinder 20 into the frac balls may include rough grinding the cylinder 20 using a grinding wheel 38, which may include a diamond abrasive grinding wheel or another suitable grinding wheel. In some embodiments, the grinding wheel 38 may include a radius corresponding to half of a spherical shape. In some embodiments, the grinding wheel 38 may be moved progressively along the cylinder 20 to form a row of multiple spherical shapes, which may be separated to form the spherical frac balls. In some embodiments, the row may include eight or more spherical shapes.

In some embodiments, carving the cylinder 20 into the frac balls may include sawing through a small connecting portion disposed between a spherical shape that may form a particular frac ball and a remaining portion of the cylinder 20. In some embodiments, carving the cylinder 20 into the frac balls may include sawing through a small connecting portion disposed between two adjacent spherical shapes that each may form a particular frac ball. Although the frac balls may be referred to in the present disclosure as being spherical, it is understood that the frac balls may be generally spherical in some embodiments. Similarly, it is understood that the cylinder 20 may be generally cylindrical.

Figure 5A:
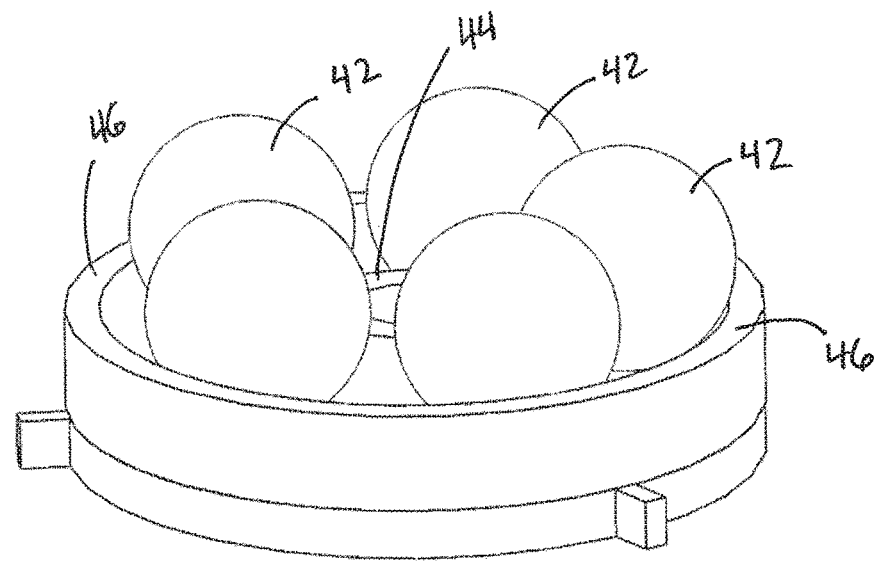
FIG. 5A is an upper perspective view of an example bottom portion of an example lapping wheel, according to some embodiments.
Figure 5B:
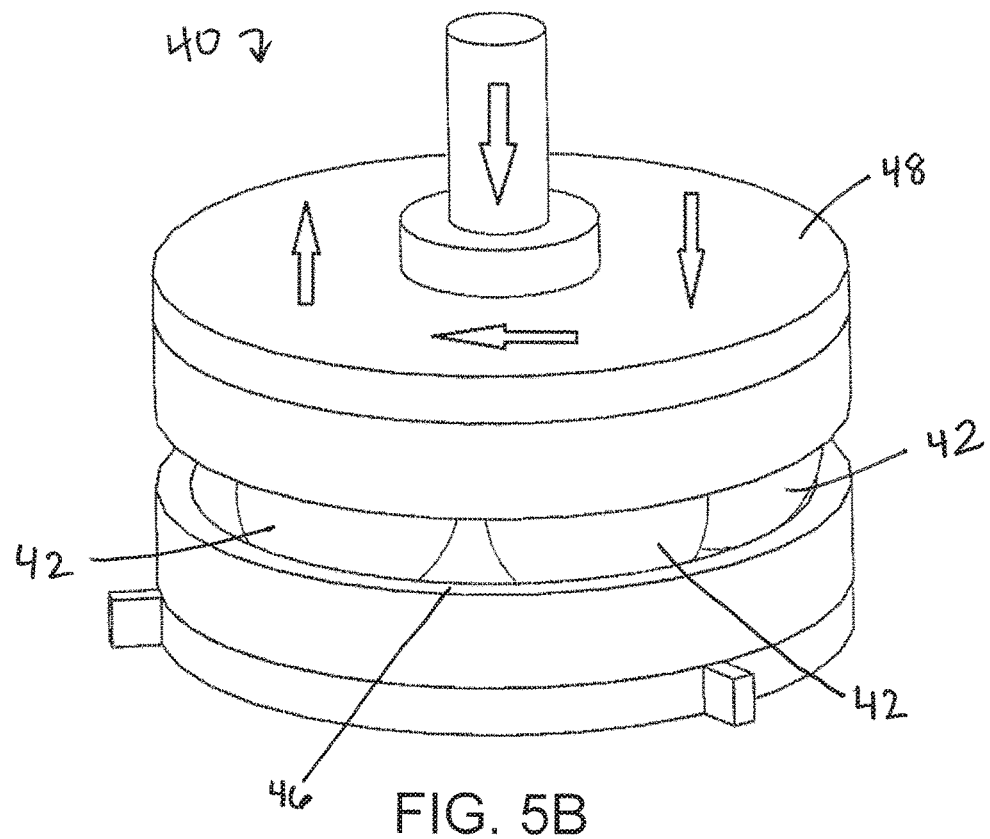
FIG. 5B is an upper perspective view of the lapping wheel, according to some embodiments.

Referring now to FIGS. 5A-5B, in some embodiments, a grinding or lapping wheel 40 and/or a vibratory container may be used to achieve a final diameter and/or finish of the frac balls 42. In some embodiments, the lapping wheel 40 may include various configurations. In some embodiments, the lapping wheel 40 may include a bottom portion having an inner rim 44 and/or an outer rim 46, which may form a donut shaped cavity. In some embodiments, the frac balls 42 may be disposed in between the inner rim 44 and the outer rim 46. In some embodiments, the frac balls 42 may sit on an abrasive material disposed within the donut shaped or radiused cavity. In some embodiments, a top portion or lid 48 may be placed on the bottom portion. In some embodiments, the lid 48 may be rotated and/or pressed towards the bottom portion to grind the frac balls 42 to desired dimensions and/or surface finish.

In some embodiments, the vibratory container (not illustrated) may include abrasive media which may grind the frac balls 42 to desired dimensions and/or surface finish when the vibratory container vibrates with the abrasive media and frac balls 42 secured inside. In some embodiments, the grinding or lapping wheel 40 may be used prior to the vibratory container to improve the surface finish from about 190 Ra after rough grinding to about 90-120 Ra. In some embodiments the grinding or lapping wheel 40 may achieve an outer diameter of about 2.251±0.001 inches for each of the frac balls 32. In some embodiments, triangular-shaped plastic media and/or hard wood may be used to improve a surface finish of the frac balls 42.

In some embodiments, a first step within the vibratory container may include improving the surface finish from about 90-120 Ra to about 70-90 Ra. In some embodiments, the first step may include use of triangular-shaped plastic media and/or may last about 3 hours. In some embodiments, a second step within the vibratory container may include improving the surface finish from about 70-90 Ra to about 40-60 Ra. In some embodiments, the second step may include use of hard wood media and/or may last about 32 hours. In some embodiments, the first and second steps within the vibratory container may remove about 0.0005-0.001 inches of material off an outer diameter of each of the frac balls 32.

In some embodiments, the frac plug mandrel may be secured inside the vibratory container with the abrasive media to grind the frac plug mandrel to desired dimensions and/or surface finish. As mentioned previously, in some embodiments, in addition to or as an alternative to using the lapping wheel and/or the vibratory container, the method of forming the mandrel of may include grinding a shape of the mandrel using a tool post grinder with a diamond abrasive wheel, which may be mounted to a carriage or table of a computer numeric control ("CNC") lathe, such as the CNC lathe 36 illustrated in FIGS. 4A-4E, for example.

In some embodiments, a grinding or lapping wheel may be configured to achieve a final diameter and/or finish of the frac plug mandrel. A size and outer diameter of the frag plug mandrel may vary. In some embodiments, an outer diameter of the frag plug mandrel may be approximately 4.5 inches. In some embodiments, the mandrel may include an outer diameter smaller than 4.5 inches but may expand when compressed such that the mandrel may seal off an oil well casing that has an inner diameter of about 4.5 inches.

Figure 6A:
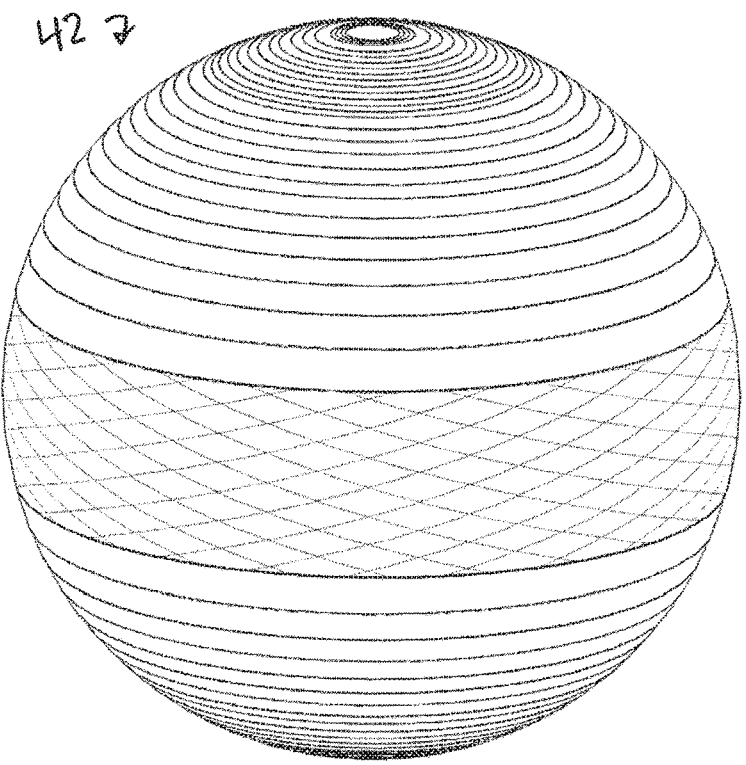
FIG. 6A is an upper perspective view of an example frac ball, according to some embodiments.
Figure 6B:
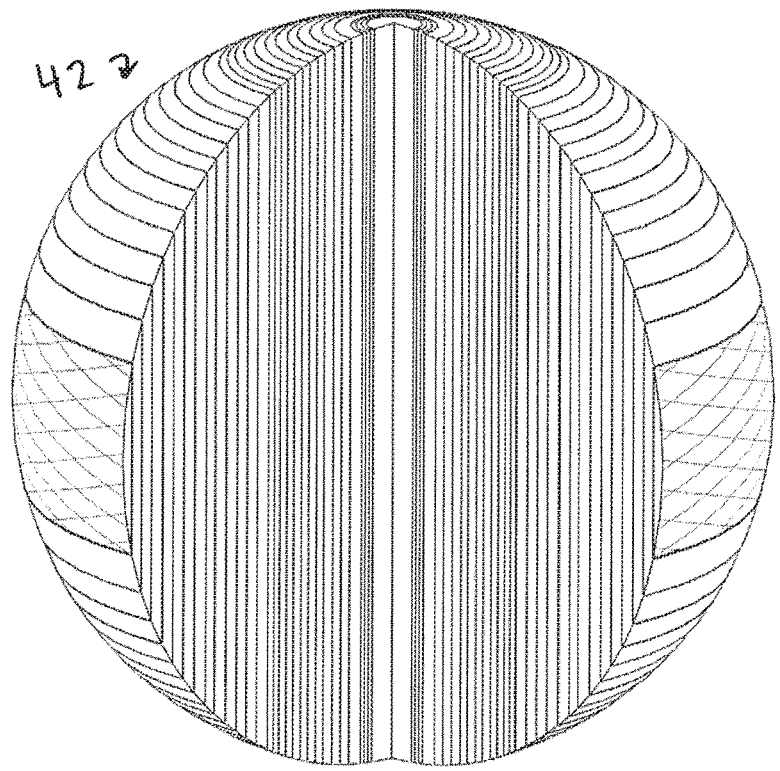
FIG. 6B is a partial cutaway view of the solid, coreless frac ball, according to some embodiments.
Figure 6C:
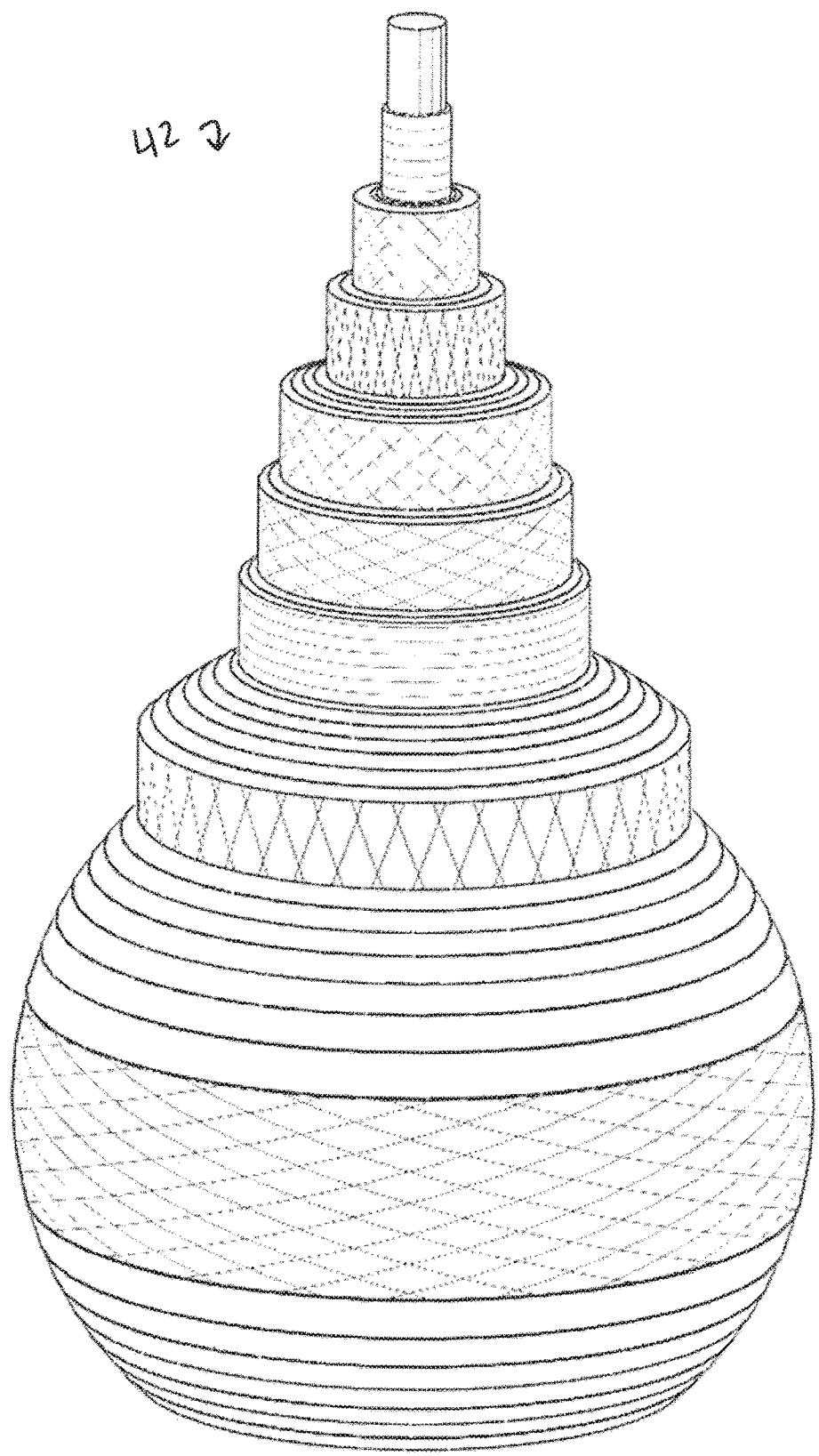
FIG. 6C is an exploded view of the frac ball, according to some embodiments.

Referring now to FIGS. 6A-6C, in some embodiments, each of the frac balls 42 may include multiple overlapping filament fragments formed from a single, continuous filament 16. In some embodiments, the filament 16 has been wound at various angles and then carved or cut to form the filament fragments. In some embodiments, the filament 16 may be carved or cut when the grinding wheel 38 or another suitable tool is used to form the frac balls 42 from the cylinder 20. A size of the frac balls 42 may vary. In some embodiments, the frac balls 42 may each have an outer diameter between 2 and 3 inches, such as, for example, 2.25 inches. In some embodiments, the frac balls 42 may each have an outer diameter of about 1-2 inches, 2-3 inches, 3-4 inches, 4-5 inches, 5-6 inches, or greater than 6 inches.

Figure 6D:
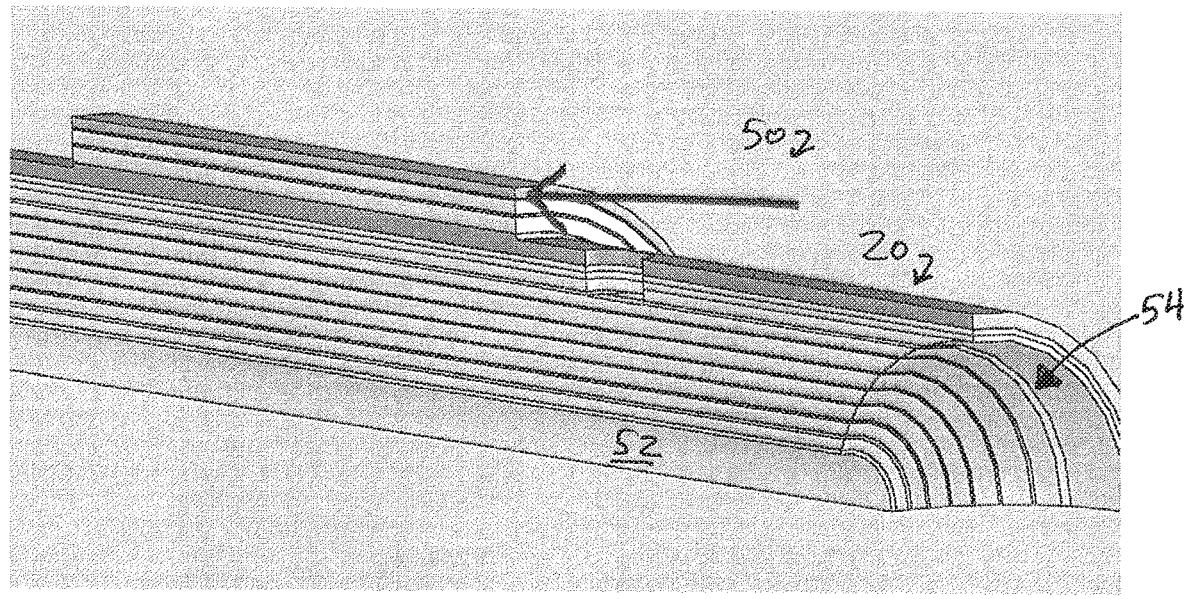
FIG. 6D is a partial cross-sectional view of an example frac plug mandrel, according to some embodiments.

Referring now to FIG. 6D, a portion of an example frac plug mandrel 50 is illustrated, according to some embodiments. In some embodiments, the filament 16 may be wound in a pattern such that outer layers of the frag plug mandrel 50 are hoop, which may prevent peeling of the outer layers of the filament 16 from inner layers of the filament 16. In some embodiments, the cylinder 20 may include a ball seat 54 and/or a fluid passage 52 extending through the frac plug mandrel 50. In some embodiments, the filament 16 may be wound into the cylinder 20 and one or more other adjoining portions that may form an overall shape of the frag plug mandrel 50.

Referring now to FIG. 7, a flow diagram of an example method 100 of forming one or more frac balls is illustrated, according to some embodiments. The method may begin at block 102. In block 102, a resin may be applied to a filament to wet the filament. In some embodiments, block 102 may be followed by block 104.

In block 104, the wetted filament may be wound, without a core, to form a cylinder. In some embodiments, the wetted filament may be wound at multiple angles without the core to form the cylinder. In some embodiments, the wetted filament may be wound using a coreless winding machine having a first driven element and a second driven element. In some embodiments, block 104 may be followed by block 106.

In block 106, the cylinder may be placed in a cylindrical mold. In some embodiments, block 106 may be followed by block 108.

In block 108, the resin or another resin may be added into the cylindrical mold. In some embodiments, block 108 may be followed by block 110.

In block 110, a pressure in the cylindrical mold may be increased to at least 500 psi. In some embodiments, block 110 may be followed by block 112.

In block 112, the resin may be cured at the pressure and a temperature of at least 250° F. In some embodiments, block 112 may be followed by block 114.

In block 114, the cylinder may be extracted from the cylindrical mold. In some embodiments, block 114 may be followed by block 116.

In block 116, the cylinder may be carved into one or more spherical frac balls. In some embodiments, block 116 may be followed by block 118.

The method of FIG. 7 may be further described with respect to one or more of FIGS. 1-6. Various elements used in the method of FIG. 7 may also be further described with respect to one or more of FIGS. 1-6. For example, the cylinder, the filament, the winding machine, the first driven element, the second driven element, the cylindrical mold, and the frac balls may correspond to the cylinder 20, the filament 16, the winding machine 10, the first driven element 12, the second driven element 14, the cylindrical mold 22, and the frac balls 42, respectively, described with respect to one or more of FIGS. 1-6. Although illustrated as discrete blocks, various blocks of method 100 may be divided into additional blocks, combined into fewer blocks, or eliminated, depending on the desired implementation. For example, block 108 may be eliminated. Furthermore, in some embodiments, the order of the blocks may be changed.

Referring now to FIG. 8, a flow diagram of an example method 200 of forming a mandrel of a frac plug is illustrated, according to some embodiments. The method may begin at block 202. In block 202, a resin may be applied to a filament to wet the filament. In some embodiments, block 202 may be followed by block 204.

In block 204, the wetted filament may be wound, with a core, to form a cylinder having a bore extending therethrough. In some embodiments, the wetted filament may be wound at multiple angles without the core to form the cylinder. In some embodiments, the wetted filament may be wound using a winding machine having a core or mandrel, which may result in the cylinder having the bore extending therethrough. In some embodiments, the bore may allow a fluid passage to extend through the frac plug mandrel. In these and other embodiments, the winding machine may include a tailstock and headstock, which are known in the art. In some embodiments, block 204 may be followed by block 206.

In block 206, the cylinder may be placed in a cylindrical mold. In some embodiments, the cylindrical mold may include a central rod that may extend through the bore of the cylinder. In some embodiments, block 206 may be followed by block 208.

In block 208, the resin or another resin may be added into the cylindrical mold. In some embodiments, block 208 may be followed by block 210.

In block 210, a pressure in the cylindrical mold may be increased to at least 500 psi. In some embodiments, block 210 may be followed by block 212.

In block 212, the resin may be cured at the pressure and a temperature of at least 250° F. In some embodiments, block 212 may be followed by block 214.

In block 214, the cylinder may be extracted from the cylindrical mold.

The method of FIG. 8 may be further described with respect to one or more of FIGS. 1-6. Various elements used in the method of FIG. 8 may also be further described with respect to one or more of FIGS. 1-6. For example, the cylinder, the filament, the winding machine, and the cylindrical mold may correspond to the cylinder 20, the filament 16, the winding machine 10, and the cylindrical mold 22, respectively, described with respect to one or more of FIGS. 1-6. Although illustrated as discrete blocks, various blocks of method 200 may be divided into additional blocks, combined into fewer blocks, or eliminated, depending on the desired implementation. For example, block 208 may be eliminated. Furthermore, in some embodiments, the order of the blocks may be changed.

The present invention may be embodied in other specific forms without departing from its structures, methods, or other essential characteristics as broadly described herein and claimed hereinafter. The described embodiments and examples are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

All examples and conditional language recited herein are intended for pedagogical objects to aid the reader in understanding the invention and the concepts contributed by the inventor to furthering the art, and are to be construed as being without limitation to such specifically recited examples and conditions. Although implementations of the present inventions have been described in detail, it should be understood that the various changes, substitutions, and alterations could be made hereto without departing from the spirit and scope of the invention.

What is claimed is:

1. A method of forming a mandrel of a frac plug, comprising: applying a resin to wet a filament; winding, with a core, the wetted filament to form a cylinder having a bore extending therethrough; placing the cylinder in a cylindrical mold; increasing a pressure in the cylindrical mold to at least 1,500 psi; curing the resin at the pressure and a temperature of at least 250° F.; reducing leak paths through the cylinder by applying the pressure to the cylinder and increasing the at a temperature to greater than 300° F. and extracting the cylinder from the mold.

2. The method of claim 1, further comprising removing voids in the cylinder by adding an additional amount of the resin into the cylindrical mold at a pumping pressure greater than 500 psi using a hydraulic pump.

3. The method of claim 1, wherein the filament comprises e-glass.

4. The method of claim 1, wherein the step of winding, with the core, the wetted filament to form the cylinder having the bore extending therethrough comprises winding the wetted filament at multiple angles.

5. The method of claim 1, wherein the step of winding, with the core, the wetted filament to form the cylinder having the bore extending therethrough comprises using a winding machine having a headstock, a tailstock, and the core.

6. The method of claim 1, further comprising using a lapping wheel or vibratory container to achieve a final diameter of the mandrel.

7. The method of claim 1, wherein the mandrel has an outer diameter of approximately 4.5 inches.

8. The method of claim 1 further comprising reducing voids and air entrapped in the cylinder by applying the pressure to the cylinder while the temperature is at least 300° F.

9. The method of claim 8 further comprising yielding a translucent cylinder for visual inspection.

10. The method of claim 1, further comprising removing voids in the cylinder by adding an additional amount of another resin into the cylindrical mold at a pumping pressure greater than 500 psi using a hydraulic pump.

11. A method of forming a mandrel of a frac plug, comprising: applying a resin to wet a filament; winding, with a core, the wetted filament to form a cylinder having a bore extending therethrough; placing the cylinder in a cylindrical mold wherein the cylindrical mold comprises a body and a plunger portion comprising a first plunger and a second plunger disposed within the first plunger; selectively adjusting the second plunger to increase or decrease the pressure within the cylindrical mold; selectively adding through the second plunger more resin once the cylinder has been compressed; increasing a pressure in the cylindrical mold to at least 1,500 psi; curing the resin at the pressure and a temperature of at least 250° F.; reducing leak paths through the cylinder by applying the pressure to the cylinder and increasing the at a temperature to greater than 300° F. and extracting the cylinder from the mold.

* * * * *